Patented Oct. 30, 1951

2,573,641

UNITED STATES PATENT OFFICE 2,573,641

NEUTRALIZATION OF THE MINERAL ACID SALTS OF AMINONITROTHIAZOLE

Harold L. Hubbard, Webster Groves, Mo., assignor to Monsanto Chemical Company, St. Louis, Mo., a corporation of Delaware No Drawing. Application July 28, 1950, Serial No. 176,548

20 Claims. (Cl. 260—306.8)

This invention relates to aminonitrothiazole; more specifically, this invention relates to an improvement in the process for the neutralization of an aqueous solution of the mineral acid salts of aminonitrothiazole.

Aminonitrothiazole is generally prepared by the nitration of acetylaminothiazole to form acetylaminonitrothiazole. The acetylaminonitrothiazole thus formed is then hydrolyzed with a mineral acid in an aqueous medium. An aqueous solution of the mineral acid salt of aminonitrothiazole is then neutralized with sodium acetate or sodium hydroxide precipitating therefrom aminonitrothiazole. The yields obtained in such a process as heretofore used are exceedingly low.

It is an object of this invention, therefore, to provide an improvement in the process for the neutralization of an aqueous solution of the mineral acid salts of aminonitrothiazole. Further objects will become apparent from a description of the novel process of this invention.

It has now been discovered that the yields of aminonitrothiazole obtained by the neutralization of an aqueous solution of its mineral acid salts, may be significantly increased over that which was heretofore obtainable by utilizing an alkaline alkali metal salt of an acid of phosphorus which is a hydrate of $P_2O_5$ (phosphorus pentoxide). According to a preferred embodiment of this invention, therefore, an alkaline alkali metal salt of an acid of phosphorus which is a hydrate of $P_2O_5$ is added to an aqueous solution of the mineral acid salt of aminonitrothiazole until the pH of said aqueous solution is greater than about 2.0, thereby precipitating therefrom aminonitrothiazole which is then recovered. The following examples are illustrative of the novel process of this invention:

Example I 65 g. of 2-acetylamino-5-nitrothiazole are dissolved in 180 g. of 100% sulfuric acid and 600 g. of water. The solution is then boiled under reflux conditions for about one hour and then cooled to 30° C. With continuous agitation and at a temperature of about 30° C., 200 g. of sodium phosphate ($Na_3PO_4$) are added, precipitating 2-amino-5-nitrothiazole. The pH of the resultant reaction mixture is greater than about 2.0. The 2-amino-5-nitrothiazole is then separated from the reaction medium by filtration, washed with water and dried by heating to a temperature of 60–70° C. Approximately an 85% yield of 2-amino-5-nitrothiazole is obtained having a melting point of 197–198° C.

Example II

The procedure set forth in Example I is repeated adding sodium acetate in place of the sodium phosphate until a pH greater than about 2.0 is obtained. Approximately a 65% yield of 2-amino-5-nitrothiazole is obtained.

Example III

The procedure set forth in Example I is repeated adding sodium hydroxide in place of the sodium phosphate until a pH greater than about 2.0 is obtained. Approximately a 28% yield of 2-amino-5-nitrothiazole is obtained.

Example IV 50 g. of the sulfuric acid salt of 2-amino-5-nitrothiazole are dissolved in 600 g. of water. 20–25 g. of sodium phosphate are then added, precipitating 2-amino-5-nitrothiazole. The pH of the resultant solution is then greater than about 2.0. The 2-amino-5-nitrothiazole is recovered by filtration, washed and dried by heating to a temperature of 60° C. 2-amino-5-nitrothiazole is obtained in approximately an 85% yield.

Example V

The procedure set forth in Example IV is repeated adding potassium pyrophosphate in place of the sodium phosphate until a pH greater than about 2.0 is obtained. The yield of 2-amino-5-nitrothiazole is comparable to that obtained in Example IV.

Example VI

The procedure set forth in Example IV is repeated adding sodium meta-phosphate in place of the sodium phosphate until a pH greater than about 2.0 is obtained. The yield of 2-amino-5-nitrothiazole is comparable to that obtained in Example IV.

Example VII

The procedure set forth in Example IV is repeated adding the sodium salt of tetra-phosphoric acid in place of the sodium phosphate until a pH greater than about 2.0 is obtained. The yield of 2-amino-5-nitrothiazole is comparable to that obtained in Example IV.

Example VIII

The procedure set forth in Example IV is repeated adding potassium tripolyphosphate in place of the sodium phosphate until a pH greater than about 2.0 is obtained. The yield of 2-amino-5-nitrothiazole thus obtained is comparable to that obtained in Example IV.

Example IX 50 g. of the hydrochloric acid salt of 2-amino-5-nitrothiazole are dissolved in 450 g. of water. Sodium phosphate is then added until the pH of the solution is greater than about 2.0. The precipitated 2-amino-5-nitrothiazole is recovered by filtration, washed and dried by heating to a temperature of 60° C. 2-amino-5-nitrothiazole is obtained in approximately an 85% yield.

Example X 50 g. of the hydrochloric acid salt of 4-amino-5-nitrothiazole are dissolved in 450 g. of water. Sodium phosphate is then added until the pH of the solution is greater than about 2.0. The precipitated 4-amino-5-nitrothiazole is recovered by filtration, washed and dried by heating to a temperature of 60° C. 4-amino-5-nitrothiazole is obtained in approximately an 85% yield.

In carrying out the novel improved process of this invention, the specific reactants, quantities of reactants and reaction conditions set forth in the preceding examples are subject to substantial variation. For example, this process is applicable to the precipitation of aminonitrothiazole from an aqueous solution of any of its mineral acid salts. Typical of such mineral acid salts are the sulfuric acid, hydrochloric acid, nitric acid and phosphoric acid salts. Furthermore, the novel process of this invention is applicable to the precipitation of any of the various isomeric aminonitrothiazoles from aqueous solutions of their mineral acid salts.

The neutralization of the aqueous solution of the mineral acid salt of aminonitrothiazole may be carried out over a wide temperature range, limited only by the freezing point and the boiling point of the solution. Preferably, it is carried out at a temperature in the range of about 10°-90° C.

Best yields of aminonitrothiazole are obtained when the quantity of the alkaline alkali metal salt of an acid of phosphorus which is a hydrate of $P_2O_5$ utilized is sufficient to neutralize all of the mineral acid salt of the aminonitrothiazole present in the aqueous solution. Preferably, the amount added should be sufficient to raise the pH of the solution to at least about 2.0. Quantities in slight excess of this amount have no deleterious effect upon the process.

Any of the alkaline alkali metal salts of an acid of phosphorus which is a hydrate of $P_2O_5$ may be utilized in the novel improved process of this invention. Such salts include the sodium, potassium and lithium salts of ortho-phosphoric acid, pyrophosphoric acid, tripolyphosphoric acid, tetra-phosphoric acid and meta-phosphoric acid. By alkali metal salt of an acid of phosphorus which is a hydrate of $P_2O_5$ is meant an alkali metal salt of an acid of phosphorus which is a hydrate of $P_2O_5$ whose water solution has a pH greater than 7.0.

After neutralization and precipitation of the aminonitrothiazole in accordance with the novel process of this invention, the aminonitrothiazole may be recovered from the reaction medium by any method well known to those skilled in the art. A particularly convenient method consists in filtering the aminonitrothiazole therefrom, washing it with water and drying it at an elevated temperature under a reduced pressure.

What is claimed is:

1. In the process for the preparation of aminonitrothiazole by the neutralization of an aqueous solution of its mineral acid salt, the improvement which comprises neutralizing said aqueous solution with an alkaline alkali metal salt of an acid of phosphorus which is a hydrate of $P_2O_5$.

2. In the process for the preparation of aminonitrothiazole by the neutralization of an aqueous solution of its sulfuric acid salt, the improvement which comprises neutralizing said aqueous solution with an alkaline alkali metal salt of an acid of phosphorus which is a hydrate of $P_2O_5$.

3. The process as described in claim 2 wherein the alkaline alkali metal salt of an acid of phosphorus which is a hydrate of $P_2O_5$ is an alkali metal phosphate.

4. The process as described in claim 3 wherein the alkali metal phosphate is sodium phosphate.

5. In the process for the preparation of 2-amino-5-nitrothiazole by the neutralization of an aqueous solution of its sulfuric acid salt, the improvement which comprises neutralizing said aqueous solution with an alkaline alkali metal phosphate.

6. The process as described in claim 5 wherein the alkali metal phosphate is sodium phosphate.

7. The process as described in claim 2 wherein the alkaline alkali metal salt of an acid of phosphorus which is a hydrate of $P_2O_5$, is an alkaline alkali metal salt of pyrophosphoric acid.

8. The process as described in claim 2 wherein the alkaline alkali metal salt of an acid of phosphorus which is a hydrate of $P_2O_5$, is an alkaline alkali metal salt of tetraphosphoric acid.

9. The process as described in claim 2 wherein the alkaline alkali metal salt of an acid of phosphorus which is a hydrate of $P_2O_5$, is an alkaline alkali metal salt of metaphosphoric acid.

10. The process as described in claim 2 wherein the alkaline alkali metal salt of an acid of phosphorous which is a hydrate of $P_2O_5$, is an alkaline alkali metal salt of tripolyphosphoric acid.

11. In the process for the preparation of aminonitrothiazole by the neutralization of an aqueous solution of its mineral acid salt, the improvement which comprises neutralizing said aqueous solution to a pH greater than about 2.0 by the addition thereto of an alkaline alkali metal salt of an acid of phosphorus which is a hydrate of $P_2O_5$.

12. In the process for the preparation of aminonitrothiazole by the neutralization of an aqueous solution of its sulfuric acid salt, the improvement which comprises neutralizing said aqueous solution to a pH greater than about 2.0 by the addition thereto of an alkaline alkali metal salt of an acid of phosphorus which is a hydrate of $P_2O_5$.

13. The process as described in claim 12 wherein the alkaline alkali metal salt of an acid of phosphorus which is a hydrate of $P_2O_5$ is an alkali metal phosphate.

14. The process as described in claim 13 wherein the alkali metal phosphate is sodium phosphate.

15. In the process for the preparation of 2-amino-5-nitrothiazole by the neutralization of an aqueous solution of its sulfuric acid salt, the improvement which comprises neutralizing said aqueous solution to a pH greater than about 2.0 by the addition thereto of an alkaline alkali metal phosphate.

16. The process as described in claim 15 wherein the alkali metal phosphate is sodium phosphate.

17. The process as described in claim 12 wherein the alkaline alkali metal salt of an acid of phosphorus which is a hydrate of $P_2O_5$, is an alkaline alkali metal salt of pyrophosphoric acid.

18. The process as described in claim 12 wherein the alkaline alkali metal salt of an acid of phosphorus which is a hydrate of $P_2O_5$, is an alkaline alkali metal salt of tetraphosphoric acid.

19. The process as described in claim 12 wherein the alkaline alkali metal salt of an acid of phosphorus which is a hydrate of $P_2O_5$, is an alkaline alkali metal salt of metaphosphoric acid.

20. The process as described in claim 12 wherein the alkaline alkali metal salt of an acid of phosphorus which is a hydrate of $P_2O_5$, is an alkaline alkali metal salt of tripolyphosphoric acid.

HAROLD L. HUBBARD.

REFERENCES CITED

The following references are of record in the file of this patent:

Chemical Abstracts, vol. 40, pp. 4056–4060, citing Ganapathi et al., Proc. Indian Acad. Sci. 22A, pp. 348–358 (1945).